United States Patent [19]

Arimoto et al.

[11] Patent Number: 5,339,451
[45] Date of Patent: Aug. 16, 1994

[54] DATA TRANSMISSION SYSTEM WHEREIN THE SETTING OF THE TRANSMIT DATA WORD NUMBER INDICATES WHETHER A NEW TRANSMISSION OR RETRANSMISSION SHOULD BE SENT

[75] Inventors: Akiya Arimoto; Yasushi Okamoto; Kikuo Muramatsu, all of Itami, Japan

[73] Assignee: Mitsubishi Denki Kabushiki Kaisha, Japan

[21] Appl. No.: 3,087

[22] Filed: Jan. 11, 1993

[30] Foreign Application Priority Data

Feb. 18, 1992 [JP] Japan .................................. 4-030609

[51] Int. Cl.⁵ ........................................... G06F 13/00
[52] U.S. Cl. .................. 395/800; 364/260.1; 364/262.2; 364/DIG. 1
[58] Field of Search ............. 395/800, 325, 425; 370/85.1, 60, 61, 94.1

[56] References Cited

U.S. PATENT DOCUMENTS

| 4,584,666 | 4/1986 | Zolnowsky et al. | 385/775 |
| 4,658,349 | 4/1987 | Tabata et al. | 395/425 |
| 4,722,051 | 1/1988 | Chattopadhya | 395/425 |
| 4,829,524 | 5/1989 | Yoshida | 371/32 |
| 5,029,124 | 7/1991 | Leahy et al. | 395/325 |
| 5,210,749 | 5/1993 | Firoozmand | 370/85.1 |

Primary Examiner—Alyssa H. Bowler
Assistant Examiner—John Harrity
Attorney, Agent, or Firm—Townsend and Townsend

[57] ABSTRACT

A Data transmission device controlled by a processor which has a transmission control apparatus (14) which re-transmits transmission data which was previously set by a microcomputer (10) and which was unable to be transmitted in a first transmission attempt. The transmission control apparatus (14) has a transmit data word number comparing circuit (28) which determines whether a value of a set transmit data word number is within the limits prescribed by a communication standard. In the event of a failed transmission attempt, the microcomputer sets a transmit data word number greater than the number prescribed by the communication standard.

13 Claims, 7 Drawing Sheets

DATA TRANSMISSION SYSTEM WHEREIN THE SETTING OF THE TRANSMIT DATA WORD NUMBER INDICATES WHETHER A NEW TRANSMISSION OR RETRANSMISSION SHOULD BE SENT

BACKGROUND OF THE INVENTION

1. Field of the Invention

The present invention relates to a communication apparatus which communicates digital data.

2. Description of the Related Art

The number of apparatus in which a plurality of electronic control units are built-in with microcomputers as their cores and the respective units are connected with a transmission line so as to compose a system, has increased with the advance of recent semiconductor technology for both industrial use and for private use.

It can be said that the most remarkable example of such apparatus is an electronically-controlled automobile. In an electronically-controlled automobile, such functions as engine control, steering control, change gear control, and braking control are performed by respectively independent electronic control units controlled by respective microcomputers. Regarding overall controls of a whole automobile, however, there is a case where it is necessary to transfer, between the other electronic control units concerned, respective control informations through a transmission line, as in the case of output power adjustment of an engine accompanying change gear control for lightening the so-called shift shock at the time of changing speed, for example.

Figure 1:
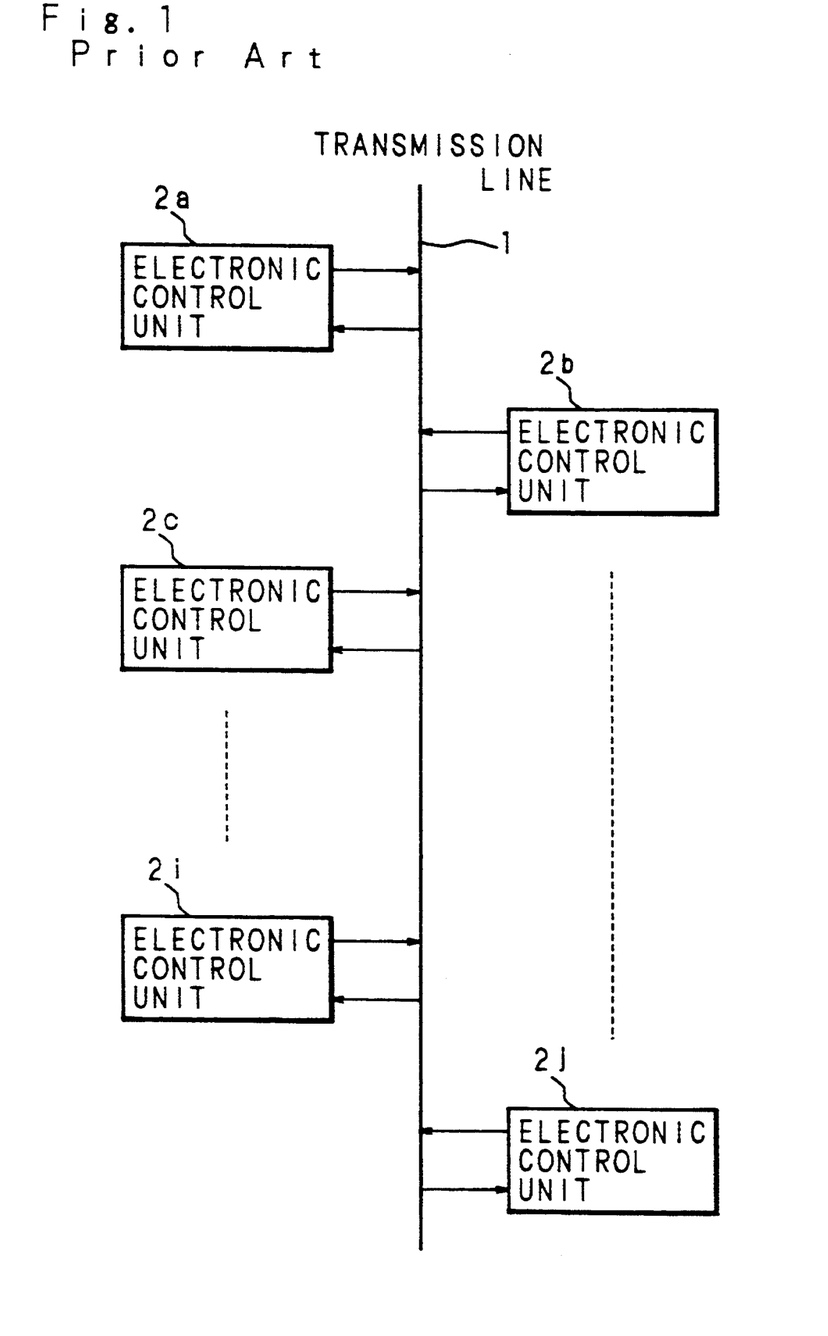
FIG. 1 is a block diagram showing a configuration example of a system of an apparatus integrated with a plurality of electronic control units, each control unit being connected.

FIG. 1 is a block diagram showing a configuration example of a system of an apparatus in which such a plurality of electronic control units are built-in, each unit being connected.

In FIG. 1, reference numeral 1 designates a transmission line for transmitting/receiving data, to which a plurality of electronic control units 2a, 2b . . . 2j are connected. In addition, this transmission line 1 is a line of one-bit-series, to be more concrete, a serial data transmission line of CSMA/CD (Carrier Sense Multiple Access/Collision Detection) type, for example.

In the case where such a transmission system as shown in FIG. 1 is applied to an automobile, the J-1850 standard standardized by SAE (Society of Automotive Engineers, Inc.) is already generally used as a kind of standard for data transfer between each of the electronic control units 2a, 2b . . . . Accordingly, the following explanation is done in accordance with the J-1850 standard. However, the essence of the present invention is applicable not only to the J-1850 but also to the other communication standards, of course.

Figure 2:
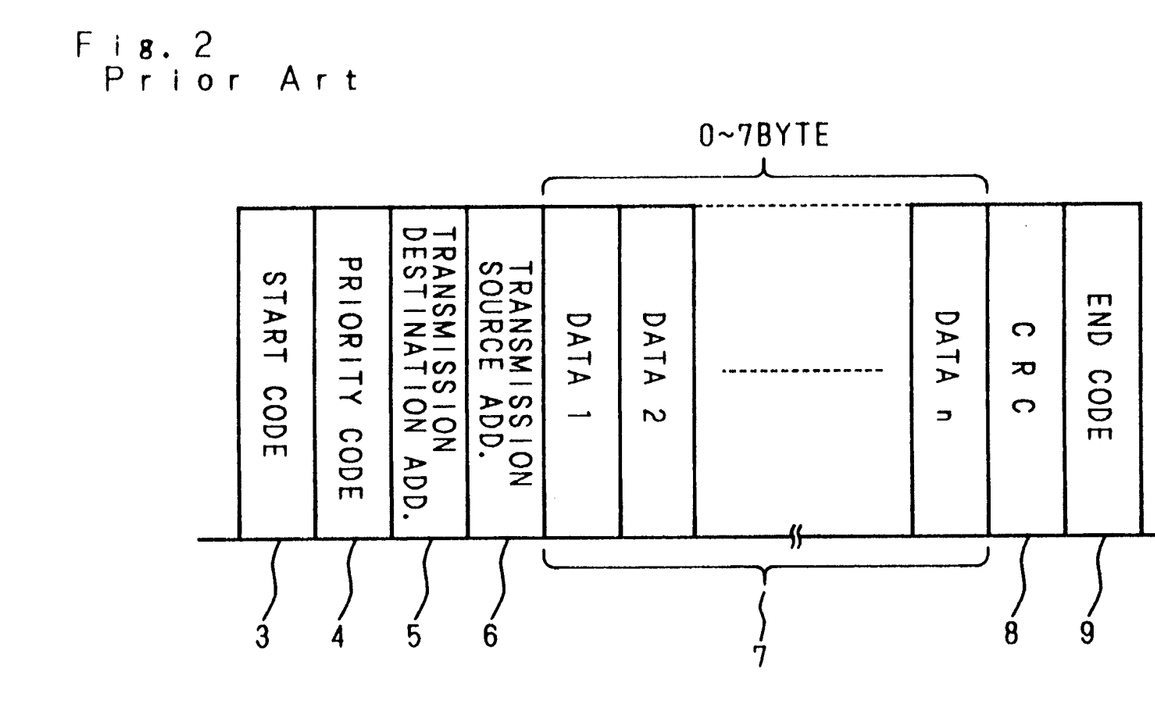
FIG. 2 is a schematic diagram showing a transmission format of J-1850 standard.

FIG. 2 is a schematic diagram showing the transmission format of the J-1850 standard.

At the head field of the transmission block, start code 3 showing the start of the transmission block is positioned, and at each of the following fields, priority code 4 of one byte, transmission destination address 5 of one byte, transmission source address 6 of one byte are positioned successively, and then transmit data 7 of 0 byte through 7 byte and CRC (Cyclic Redundancy Check) code 8 of one byte for detecting data error of the block are positioned, and at the last field, end code 9 is positioned. And each communication node (each of the electronic control units 2a, 2b . . . 2j in FIG. 1 corresponds thereto) writes necessary data in each field of such a transmission block to deliver it to the transmission line 1, thereby communication is performed between each other.

By the way, in the system shown in the aforesaid FIG. 1, since one transmission line 1 is shared by all of the electronic control units 2a, 2b . . . 2j, in the case where a plurality of communication nodes, requiring transmitting at the same time, start transmitting at the same time, collision detection is carried out while the three bytes of the priority code 4, transmission destination address 5 and transmission source address 6 are delivered to the transmission line. According to one method, when a communication node, having delivered a high-priority transmission block, continues transmitting, competitive control is performed.

In the case where a communication standard such as the J-1850 standard is used, it is not practical to directly control the transmission line 1 in the intervals of primary control by the microcomputer of each of the electronic control units, since the load on the microcomputer becomes heavy. Therefore, a configuration, such that a transmission control apparatus independent from the host microcomputer is installed in each electronic control unit and the transmission control apparatus performs transmission line control such as data modulation and competition control, is widely adopted. When such a configuration is adopted, the host microcomputer only sets all kinds of parameters necessary for transmitting and data to be transmitted in the transmission control apparatus. Then the transmission control apparatus controls the transmission line 1 independently from the host microcomputer so as to perform transmitting. When receiving the transmission control apparatus controls the transmission line 1 independently, therefore the host microcomputer is only required to receive statuses such as receive data and results of transmitting/receiving. Thus, configuration can be made to have extremely little load to the host microcomputer.

Figure 3:
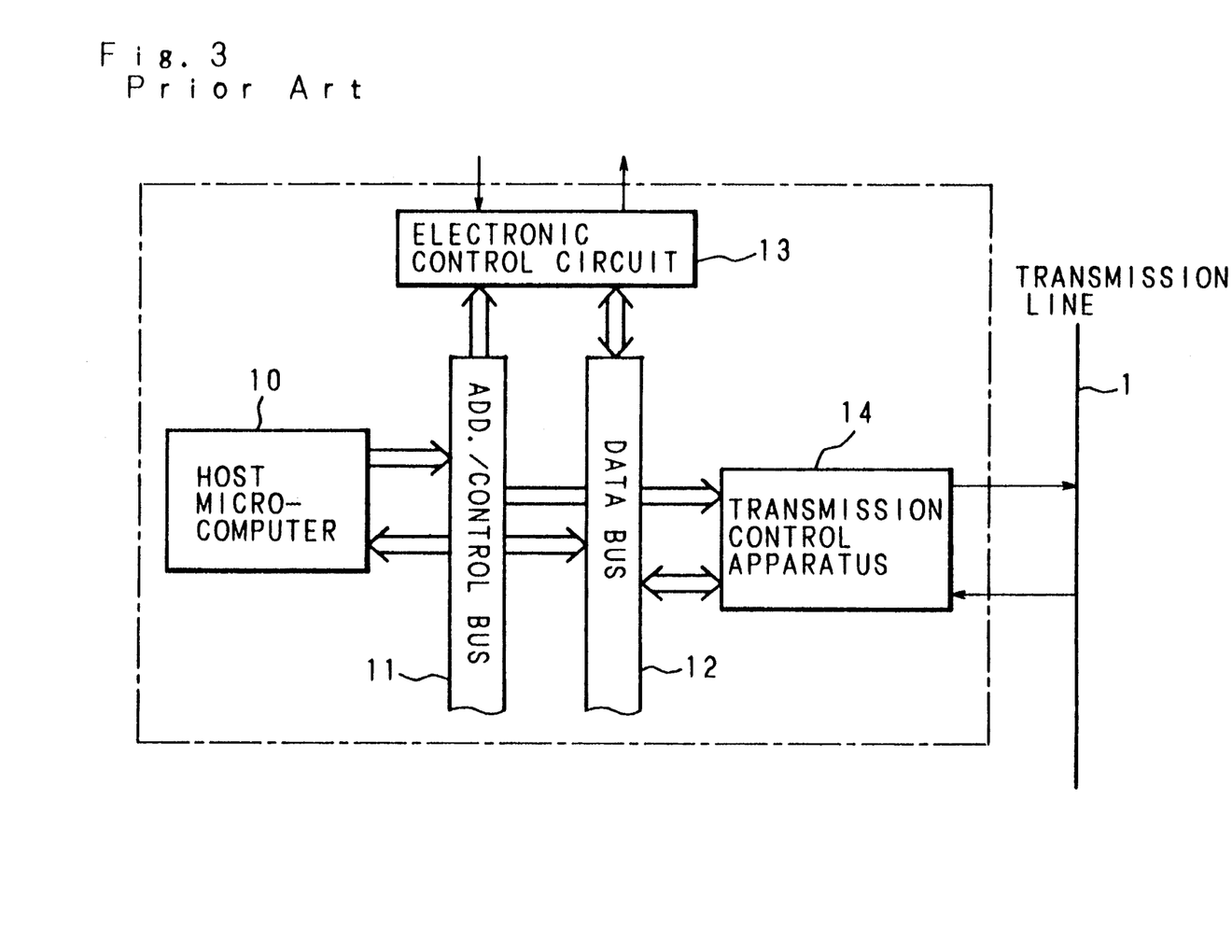
FIG. 3 is a block diagram showing a configuration example of an electronic control unit.

FIG. 3 is a block diagram showing a configuration example of an electronic control unit using such a configuration.

In FIG. 3, the region surrounded by a dashed line corresponds to each of the electronic control units 2a, 2b . . . 2j shown in FIG. 1. Reference numeral 10 designates a host microcomputer. This host microcomputer 10 is connected with an address/control bus 11 and a data bus 12, and outputs address and control signals to the address/control bus 11 as well as transmits/receives data between itself and an external control circuit. In addition, data transfer from this host microcomputer 10 to the transmission control apparatus 14 through the data bus 12 is performed by serial data transfer.

Reference numeral 13 designates an electronic control circuit conducting engine control or variable speed control, for example, and the circuit is connected with the aforesaid address/control bus 11 and the data bus 12. Numeral 14 designates a transmission control apparatus and the apparatus is connected with the address/control bus 11 and the data bus 12 in the same way.

In the case where a host microcomputer 10 of a certain electronic control unit transmits a message or information to another electronic control unit, it specifies each register and memory (refer to FIG. 4) of the transmission control apparatus 14 through the address/control bus 11 and sets necessary data via the data bus 12, thereby it activates the transmission control apparatus 14 to deliver data. After that, the host microcomputer 10 only confirms the transmission/reception status by reading the status of the transmission control apparatus 14 at any time via the data bus 12.

Figure 4:
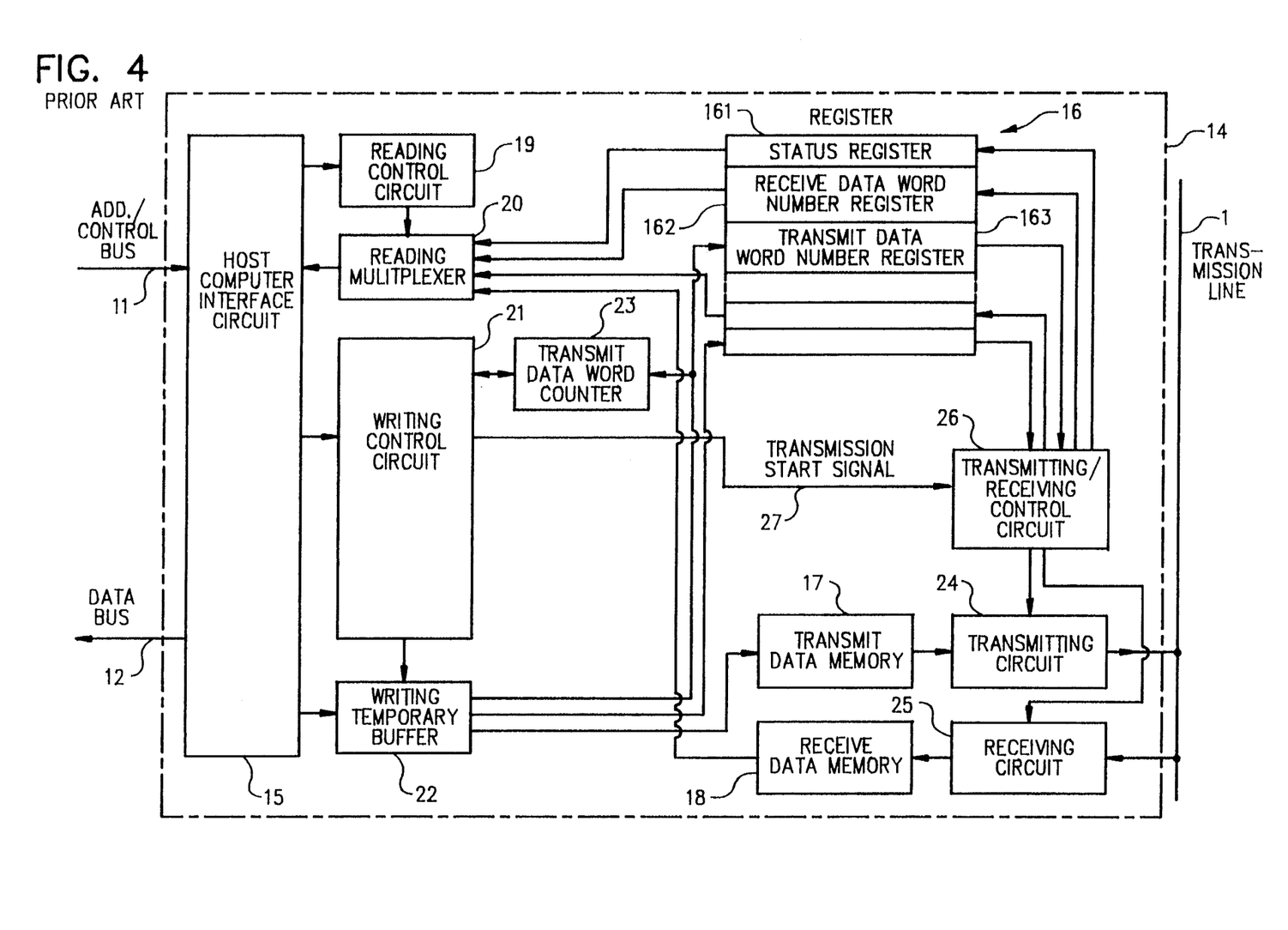
FIG. 4 is a block diagram showing a configuration example of a conventional transmission control apparatus.

FIG. 4 is a block diagram showing a configuration example of such a transmission control apparatus 14 as aforementioned.

In FIG. 4, reference numeral 15 designates a host computer interface circuit and the circuit is connected, as shown in FIG. 3, with the host microcomputer 10 through the address/control bus 11 and the data bus 12. To the host computer interface circuit 15, a reading control circuit 19, a reading multiplexer 20, writing control circuit 21 and writing temporary buffer 22 are connected.

The reading control circuit 19 is provided so as to read all kinds of data and information and read receive data from various kinds of registers to be described later by controlling switching of the reading multiplexer 20 according to the control signal given from the host microcomputer 10 through the address/control bus 11. To the reading multiplexer 20, some registers, such as a status register 161 and a receive data word number register 162, for example, among a plurality of registers constructing a register 16 or a receive data memory 18 and the like are connected. When the reading multiplexer 20 selects any of the registers or memories according to controlling by the reading control circuit 19 so as to connect with the host computer interface circuit 15, the host microcomputer 10 can read the contents of the register and memory through the data bus 12.

The writing control circuit 21 controls the writing temporary buffer 22 according to a control signal given through the address/control bus 11 from the host microcomputer 10. The writing temporary buffer 22 is provided so as to temporarily store all kinds of data and information sent from the host microcomputer 10 through the data bus 12, and writes them into various kinds of registers, to be described later, and a transmit data memory 17 after writing is synchronized with the operation inside the transmission control apparatus 14 according to control of the writing control circuit 21. To the writing temporary buffer 22, some registers such as a transmit data word number register 163, for example, and the like among a plurality of registers composing the register 16, and the transmit data memory 17 and the like are connected.

And to the writing control circuit 21, also a transmit data word counter 23 and a transmitting/receiving control circuit 26 are connected. In transmitting, the transmit data words is sent to the transmit data word counter 23 from the host microcomputer 10, and the value thereof is decremented as transmit data is stored in the transmit data memory 17. And this transmit data word number is also set in the transmit data word number register 163 in the register 16. Transmission start signal 27 is given to the transmitting/receiving control circuit 26 from the writing control circuit 21. This transmission start signal 27 is outputted in the case where the counting value of the aforesaid transmit data word number counter 23 is down-counted from the value set by the host microcomputer 10 to become "0", in other words, at the time when all of data to be transmitted is stored in the transmit data memory 17. Thereby the transmitting-/receiving control circuit 26 is started to start the actual transmitting operation.

Into the transmit data memory 17, transmit data is written from the host microcomputer 10 as aforementioned. According to control from the transmitting-/receiving control circuit 26, it is transmitted to the transmission line 1 from the transmitting circuit 24. And into the receive data memory 18, receive data is stored from the transmission line 1 through a receiving circuit 25 according to control from the transmitting/receiving control circuit 26.

The registers composing the register 16 are the status register 161 storing status of receive data or status of results of transmitting/receiving and the like, receive data word number register 162 storing word numbers of receive data, transmit data word number register 163 in which data word number to be transmitted is set from the host microcomputer 10 and the like.

Next, an explanation will be given of the operation of the transmission control apparatus 14 having the aforesaid configuration.

At first, the host microcomputer 10 controls the address/control bus 11 and the data bus 12 so as to read the status register 161 in the register 16 of the transmission control apparatus. And as a result, when it is judged that transmitting is possible, the host computer 10 sets each parameter for transmitting (transmit data word number and the like) in the register 16 and also writes transmit data in the transmit data memory 17. Then, when transmission start signal 27 is given to the transmitting/receiving control circuit 26, transmit data written in the transmit data memory 17 is transmitted to the transmission line 1 through the transmitting circuit 24.

The host microcomputer 10 reads the status register 161 in the register 16, and when it is judged that receiving is completed, it reads the receive data memory 18 to receive data.

The selection at the time of reading of all kinds of information and data from each register and memory inside the transmission control apparatus 14 is carried out in such a way that the reading control circuit 19 receives the content of the address/control bus 11 from the host computer interface circuit 15 and controls the reading multiplexer 20 so as to select content of a target register or memory and outputs it to the host computer interface circuit 15.

On the other hand, all kinds of information and data are written into registers and memories inside the transmission control apparatus 14 by the writing control circuit 21 after writing data outputted from the host microcomputer 10 is held temporarily in the writing temporary buffer 22, since writing is synchronized with the operation of the transmission control apparatus 14.

Controlling of the transmission line 1 is carried out by the transmitting/receiving control circuit 26. In the case where transmitting is performed to the circuit 26 itself from the transmission line 1, the circuit 26 makes the receiving circuit 25 to operate so as to store data in the receive data memory 18, and information of receive data word number, status at the time of receiving and the like are set in the register 16.

Transmitting is done in the following procedures. Since the transmit data word number is variable in this conventional example, the host microcomputer 10 at first sets it. That is, the writing control circuit 21 writes transmit data word number received from the host microcomputer 10 into the transmit data word number register 163 as well as writes it into the transmit data word number counter 23. After that, the host microcomputer 10 writes transmit data into the transmit data memory 17 successively, however, the writing control circuit 21 counts down the transmit data word number 23 one by one every time one word of transmit data is written in the transmit data memory 17. When this counting value becomes "0", writing of all transmit data into the transmit data memory 17 is completed, therefore, the writing control circuit 21 sends the transmit start signal 27 to the transmitting/receiving control circuit 26, and the transmitting/receiving control circuit 26 controls the transmitting circuit 24 so as to try transmitting.

In the case where transmitting is tried in such a way, a result of transmission failure or the like owing to collision with another transmission at the transmission line 1, is set in the status register 161 of the register 16 after finishing transmission trial. The host microcomputer 10 reads this content and performs proper processing. To be concrete, in case of transmission failure, transmit data word number is set in the register 16 again and all transmit data to be transmitted is written once more in the transmit data memory 17, thereby transmitting is tried again.

Since the conventional communication apparatus is so configured as aforementioned, when retransmitting in case of transmission failure, since the same processing should be done once more as that of the case where transmission is newly tried, the host microcomputer has a heavy load. Especially, frequent collisions owing to a large amount of transmit data amount on the transmission line results in a big problem.

SUMMARY OF THE INVENTION

The present invention has been devised in order to solve such a problem, and the object thereof is to provide a transmission control apparatus capable of limiting or minimizing the load from re-transmission by the host microcomputer after a transmission trial which resulted in failure.

The communication apparatus related to the invention is one wherein a detecting means, for detecting whether or not a set value of the transmit data word number is within the limits of the transmittable number prescribed according to a communication standard, is provided in the transmission control apparatus. The microcomputer performs usual transmission processing at the first communication as the conventional one does and in re-transmitting after the first transmitting being finished is failure, it sets the transmit data word number in the transmission control apparatus beyond the limits prescribed according to the aforesaid communication standard. In the case where the transmit data word number is set within the limits prescribed according to the communication standard, the transmission control apparatus performs the usual transmitting process after parameters and transmit data are set by the microcomputer. In the case where the transmit data word number is set beyond the limits prescribed according to the communication standard, the transmission control apparatus uses again the parameter and transmit data already set by the microcomputer for the immediately preceding transmission so as to perform transmission processing again.

The communication apparatus related to the invention prescribes the value of transmit data word number in advance to be less than $2^m$ according to a communication standard, and the detecting means detects whether or not the transmit data word number set from the microcomputer is less than $2^m$. The microcomputer sets, in the transmission control apparatus, transmission information including a transmit data word number less than $2^m$ in the case where a new transmitting is performed, and sets in the transmission control apparatus $2^m$ as the transmit data word number in the case where re-transmitting is performed if the previous attempt finished in failure. In the case where the transmit data word number set from the microcomputer is detected not to be $2^m$ by the detecting means, the transmission control apparatus, delivers it to the transmission line after parameters and transmit data for a new transmission are set in the storing means by the microcomputer. In the case where the transmit data word number set from the microcomputer is detected to be $2^m$ by the detecting means, the transmission control apparatus delivers the parameter and transmit data already stored in the storing means to the transmission line.

Further, in the communication apparatus of the present invention, a value of transmit data word number is prescribed to be less than $2^m$ in advance according to a communication standard. The detecting means logical-operates transmit data word number and $2^m$ set from the microcomputer. The microcomputer sets in the transmission control apparatus transmission information including a transmit data word number less than $2^m$ if a new transmitting is performed, and sets in the transmission control apparatus $2^m$ as transmit data word number if re-transmitting is performed after a previous attempt finished in failure. And the transmission control apparatus delivers a new parameter and transmit data for new transmitting to the transmission line after they are set in the storing means by the microcomputer in the case where the result of logical operation of transmit data and $2^m$ set from the microcomputer is detected to be "0" by the detecting means, and delivers a parameter and transmit data for transmitting, already stored in the storing means, to the transmission line in the case where a result of logical operation of transmit data word number and $2^m$ set from the microcomputer is detected to be "1" by the detecting means.

In the communication apparatus related to the present invention, in transmitting at a first time, a transmit data word number within the limits of numbers and the other parameter prescribed according to the communication standard from the microcomputer and transmit data are set, so as to perform transmitting. In re-transmitting after a transmitting failure, transmission trial is performed without re-setting the transmit data sent from the microcomputer to the transmission control apparatus because a transmit data word number beyond the limits of numbers prescribed in advance according to communication standard from the microcomputer is set.

And in the communication apparatus of the invention, re-transmitting can be performed when the microcomputer only sets $2^m$ as transmit data word number to the transmission control apparatus, and the detecting means only detects whether or not transmit data word number set from the microcomputer to be $2^m$.

Further in the communication apparatus of the invention, re-transmitting can be performed when the microcomputer only sets $2^m$ as transmit data word number to the transmission control apparatus, and the detecting means detects a value of the highest bit thereof.

The above and further objects and features of the invention will more fully be apparent from the following detailed description with accompanying drawings.

DESCRIPTION OF THE PREFERRED EMBODIMENT

In the following, description will be made on the invention referring to drawings showing embodiments thereof.

Figure 5:
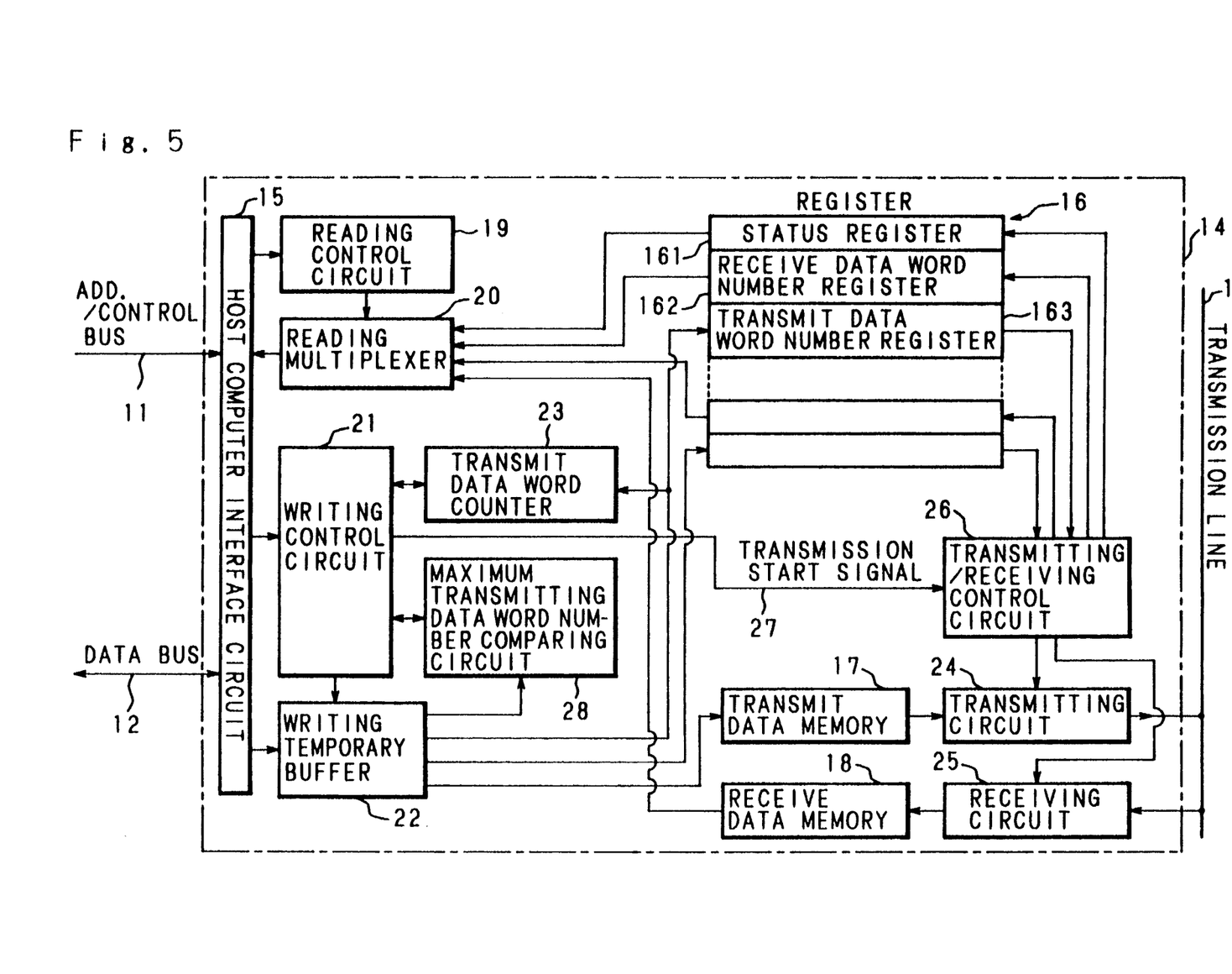
FIG. 5 is a block diagram showing a configuration example of a transmission control apparatus of a communication apparatus of the invention.

FIG. 5 is a block diagram showing a configuration example of a transmission control apparatus of a communication apparatus of the invention. In addition, in FIG. 5, the same reference characters as in FIG. 4 referred to the explanation of the aforesaid conventional example show the same or corresponding portions. And the configuration of portions other than the transmission control apparatus are similar to those of the conventional example.

This transmission control apparatus 14 is interposed between the host microcomputer 10 and the transmission line 1 both configuring the communication apparatus of the invention. And the transmission line 1 is a line of one bit series in the same way as in the conventional example, that is it is a serial data transmission line of CSMA/CD (Carrier Sense Multiple Access/Collision Detection) type, for example.

In FIG. 5, reference numeral 15 designates a host microcomputer interface circuit, and the circuit 15 is connected with the host microcomputer 10 in the same way as in the conventional examples as shown in FIG. 3 through an address/control bus 11 and a data bus 12. In addition, data transfer from the host microcomputer 10 to the transmission control apparatus 14 through the data bus 12 is performed by serial data transfer.

To the host computer interface circuit 15, a reading control circuit 19, a reading multiplexer 20, a writing control circuit 21, and a writing temporary buffer 22, in the transmission control apparatus 14 are connected.

The reading control circuit 19 is provided so as to read all kinds of data and information from various kinds of registers to be described later, and receive data by controlling switching of the reading multiplexer 20 according to the control signal given from the host microcomputer 10 through the address/control bus 11. To the reading multiplexer 20, some registers such as a status register 161 and a receive data word number register 162, for example, among a plurality of registers composing the register 16, and the receive data memory 18 and the like are connected. When the reading multiplexer 20 selects any of the registers and memories according to control of the reading control circuit 19 so as to connect with the host computer interface circuit 15, the host microcomputer 10 can read the contents of the register and the memory through the data bus 12.

The writing control circuit 21 controls the writing temporary buffer 22 according to control signal given from the host microcomputer 10 through the address-/control bus 11. The writing temporary buffer 22 is provided to temporarily store all kinds of data and information sent from the host microcomputer 10 through the data bus 12 and writes them into various kinds of registers to be described later and a transmit data memory 17 after writing is synchronized with the operation inside the transmission control apparatus 14 according to control of the writing control circuit 21. To the writing temporary buffer 22, some registers such as the transmit data word number 163 and the like, for example, among a plurality of registers composing the register 16 and the transmit data memory 17 are connected.

And to the writing control circuit 21, a maximum transmit data word number comparing circuit 28, a transmit data word number counter 23 and a transmitting/receiving control circuit 26 are also connected.

The maximum transmit data word number comparing circuit 28 compares a value of maximum transmit data word number predetermined according to a communication standard such as J-1850 standard, for example, with transmit data word number to be written by the host microcomputer 10 in the transmit data word number counter 23 and the transmit data word number register 163 of the register 16 while the transmit data word number is temporarily held in the writing temporary buffer 22. The result of comparison by the maximum transmit data word number comparing circuit 28 is given to the writing control circuit 21.

In addition, as the result of comparison by the maximum transmit data word number comparing circuit 28, the writing control circuit 21 performs processings in the same way as the conventional one does in the case where transmit data temporarily held in the writing temporary buffer 22 is equal to or less than the maximum transmit data word number. On the other hand, as the result of comparison by the maximum transmit data word number comparing circuit 28, the writing control circuit 21 performs processings differently from those of the conventional, to be described later, in the case where the transmit data word number temporarily held in the writing temporary buffer 22 is more than the maximum transmit data word number.

To the transmit data word number counter 23 in transmitting, the transmit data word number is set from the host microcomputer 10, and the actual transmit data is set in the transmit data memory 17. Next, thereby the counting value thereof is down-counted. The transmit data word number is also set in the transmit data word number register 163 in the register 16. The transmit start signal 27 is given from the writing control circuit 21 to the transmitting/receiving control circuit 26. In the case where a counting value of the aforesaid transmit data word number counter 23 is downcounted from a value set by the host microcomputer 10 to become "0", in other words, at the time when all data to be transmitted is stored in the transmit data memory 17, the transmission start signal 27 is outputted, thereby control of the transmitting/receiving control circuit 26 is started and an actual transmitting operation is started in the same way as the conventional example does.

Besides, in the communication apparatus of the invention, also in the case where the transmit data number temporarily held in the writing temporary buffer 22 is judged to be more than the maximum transmit data word number by the maximum transmit data word number comparing circuit 28, the transmit start signal 27 is outputted from the writing control circuit 21 so as to start control of the transmitting/receiving control circuit 26.

Into the transmit data memory 17, transmit data is written from the host microcomputer 10, as aforementioned, and is transmitted from the transmitting circuit 24 to the transmission line 1 by controlling of the transmitting/receiving control circuit 26. And into the receive data memory 18, receive data is stored from the transmission line 1 through the receiving circuit 25 according to control of the transmitting/receiving control circuit 26.

The registers composing the register 16 are: the status register 161 for storing status of receive data or status of results of transmitting/receiving and the like, the receive data word number register 162 for storing receive data word number, and the transmit data word number 163 for storing data word number to be transmitted from the host microcomputer 10 and the like.

Next, an explanation of the operation of the transmission control apparatus of the communication apparatus of the invention, which has such a configuration as aforementioned will be given. In addition, explanation of the operation at the time of receiving and of the case where an actual transmit data word number obtained by setting comparison result by the maximum transmit data word number comparing circuit 28 into the transmit data word number counter 23 from the host microcomputer 10, is less than maximum transmit data word number are omitted since operations are the same as in the aforesaid conventional example.

At first, the host microcomputer 10 performs controlling for transmitting in the same way as the conventional. In this case, the transmit data word number set in the transmit data word number counter 23 and the transmit data word number register 163 of the register 16 from the host microcomputer 10 is temporarily held in the writing temporary buffer 22 before it is written into the register 16. A value of the transmit data word number held in this writing temporary buffer 22 is compared with maximum word number of transmit data prescribed by a communication standard by the maximum transmit data word number comparing circuit 28. In addition, in this case, that is, when making a first transmitting attempt, the transmit data word number temporarily held in the writing temporary buffer 22 is equal to the maximum transmit data word number or less. Therefore, when the writing control circuit 21 receives that comparison result from the maximum transmit data word number comparing circuit 28, it performs transmission processing in the same way as the conventional. That is, the writing control circuit 21 writes the value into the transmit data word number register 163 of the register 16 and the transmit data word number counter 23, and in the following in the same way as in the conventional example, every time transmit data is written into the transmit data memory 17 by the host microcomputer, the transmit data counter is counted down, and when the counting value becomes "0", the writing control circuit 21 sends a transmission start signal 27 to the transmitting/receiving control circuit 26 and starts operation for transmitting. This operation is the same as that in the conventional example.

In the case where transmitting finished in failure because of a collision at the transmission line 1 in spite of transmission trial at the first time performed in such a way, the host microcomputer 10 tries re-transmitting after a proper time interval. In re-transmitting, the host microcomputer 10 conventionally performs the same processings as in the case where a totally new transmitting is performed. However, in the communication apparatus of the invention, only such a processing is performed that a value more than the maximum transmit data determined according to a communication standard is given to the transmission control apparatus 14 as the transmit data word number.

When a value more than the maximum transmit data word number is given to the transmission control apparatus 14 as the transmit data word number from the host microcomputer 10, the maximum transmit data word number comparing circuit 28 compares the transmit data word number temporarily held in the writing temporary buffer 22 with the maximum transmit data word number determined according to the communication standard. In this case, since the value of the transmit data word number is, of course, more than the maximum transmit data word number, the writing control circuit 21 doesn't write it into the register 16 and the transmit data counter 23, and immediately gives the transmission start signal 27 to the transmitting/receiving control circuit 26. At this time, in each of the registers of the register 16 including the transmit data word number register 163 and in the transmit data memory 17, since all kinds of transmission parameters and transmit data including transmit data word numbers respectively written at the transmission trial performed immediately before are still stored intact, those data are able to be used intact. That is, the host microcomputer 10 is capable of making the transmission control apparatus 14 re-transmit quite the same content as the previous, failed transmission, by only giving a value more than the maximum transmit data word number determined according to the communication standard as the transmit data word number, without giving all kinds of control signals, and data and information necessary to make a new transmission.

In addition, in the aforesaid embodiment, explanation was given on an example in which a set value of a transmit data word number is arithmetically compared with a prescribed maximum transmit data word number arithmetically by the maximum transmit data word number comparing circuit 28. However, it is also possible of course to compare them according to logical operation, and in this case, the size of the circuit can be made smaller in comparison with that in the aforesaid embodiment.

In the J-1850 standard, for example, since the maximum transmit data word number is seven bytes, "8" being $2^m$ ($2^3$, that is, m=3), is used as a set value of the transmit data word number for re-transmitting, and detection of coincidence of the set value with "8" can be used in place of the comparison for detecting which is larger or smaller.

Figure 6:
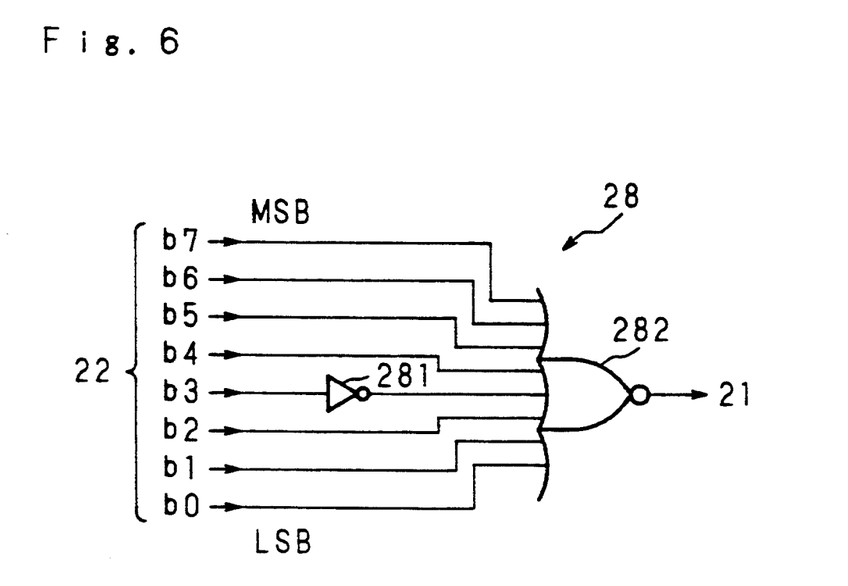
FIG. 6 is a circuit diagram of another configuration example of a maximum transmit data word number comparing circuit of a transmission control apparatus of a communication apparatus of the invention.

FIG. 6 is a circuit diagram for such a logical operation. This circuit employs, as the maximum transmit data word number comparing circuit 28, a circuit comprising an inverter 281 and a NOR gate 282 of eight inputs. To this maximum transmit data word number comparing circuit 28, data obtained by converting a value of the transmit data word number temporarily held in the writing temporary buffer 22 into a binary number of one byte (eight bits) of b7, b6, b5, b4, b3, b2, b1 and b0 in order from most significant bit (MSB) side to least significant bit (LSB) side is given. But b3, the fourth bit from LSB side is inverted "1"/"0" by the inverter 281 so as to be inputted to the NOR gate 282, and the other seven bits are inputted intact thereto.

Accordingly, in the case where transmit data word number is "8", a value obtained by converting "8" of decimal number into binary number, that is, (b7, b6, b5, b4, b3, b2, b1, b0)=(0, 0, 0, 0, 1, 0, 0, 0) is inputted from the writing temporary buffer 22 to the maximum transmit data word number comparing circuit 28. And only b3 is inverted by the inverter 281 and all of eight inputs of the NOR gate 282 become "0", therefore the output thereof becomes "1. Thereby, it is detected that a value of transmit data word number held in the writing temporary buffer 22 is "8".

In addition, in the case where the transmit data word number is not "8", at least one of the input signals to the NOR gate 282 becomes "1", therefore, the output signal of the NOR gate 282 becomes "0". Thereby, it is detected that output signal from the writing temporary buffer is not "8".

It is desirable that such output signal of the NOR gate 282 is given to the writing control circuit 21.

And, a detection performed by only taking a logical product of a set value of the transmit data word number and 8, is also possible. It is preferable to use a circuit as described below; when a value, obtained by converting a value of transmit data word number temporarily held in the writing temporary buffer 22 into a binary number of one byte (eight bits), is assumed to be b7, b6, b5, b4, b3, b2, b1 and b0 from most significant bit (MSB) side to least significant bit (LSB) side in the same way as the aforesaid case, it is proper to input a value of b3, a fourth bit from LSB side, directly into the writing control circuit 21 and determine at the writing temporary buffer 22 whether or not the transmission start signal 27 is outputted corresponding to whether the value of b3 is "1" or "0".

Figure 7:
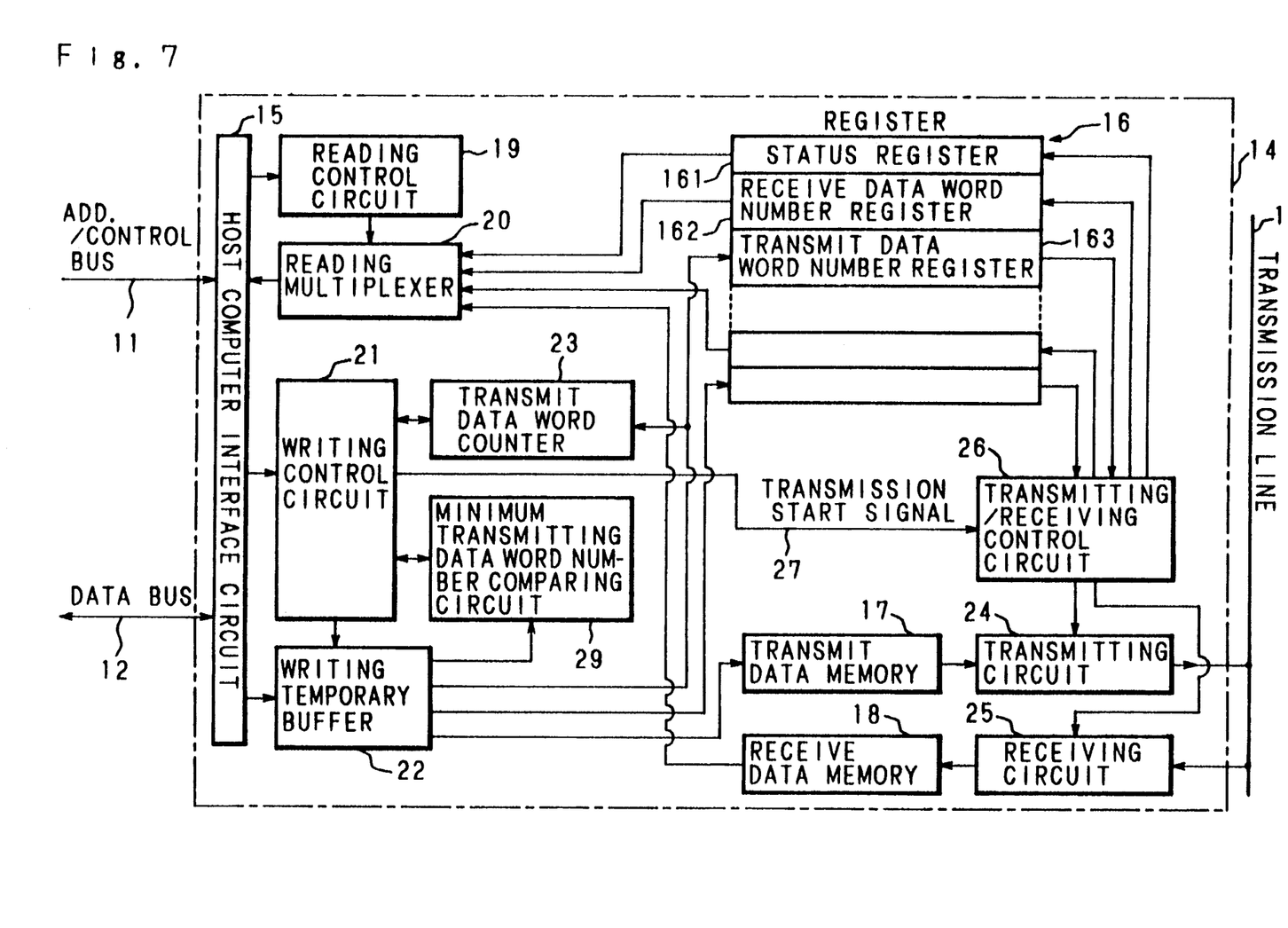
FIG. 7 is a block diagram showing another embodiment of a configuration of a transmission control apparatus of a communication apparatus of the invention.

In addition, in the case of J-1850 standard applied in the explanation of the aforesaid embodiment, it can't be applied to the following description since the maximum transmit data word number is 0, however, in the other communication standard, in the case where the minimum transmit data word number is not 0, it is possible to obtain the same effect by providing a minimum transmit data word number comparing circuit 29 which compares a prescribed minimum value of transmit data with a set value, as shown in FIG. 7, in place of the maximum transmit data word number comparing circuit 28 which compares a prescribed maximum value of the transmit data with a set value.

And further, in the aforesaid explanation, it is configured so that a setting from the host microcomputer to the transmission control apparatus 14 is carried out by writing/reading employing the address/control bus 11 and the data bus 12, however, the present invention is effective also in the case where a setting, according to serial data transfer widely used in a one-chip-microcomputer, is carried out to the transmission control apparatus 14.

More further, the circuit configuration of the transmission control apparatus of the communication apparatus of the invention aforementioned is possible to be integrated easily on a same semiconductor substrate, however, it is also possible to integrate a part or whole of each arithmetic circuit, control circuit and storing circuit composing the host computer on a same semiconductor substrate, and in this case, it is possible to configure a more inexpensive and highly reliable system.

According to the invention aforedescribed, it becomes possible to minimize the load on the host microcomputer at the time of re-trial of transmitting by providing a comparing circuit which compares a value of the transmit data word number set in the transmission control apparatus within limits of prescribed transmit data, and by switching the matter that transmitting is tried after the transmit data is set corresponding to the comparison result of the comparing circuit by setting proper transmit data word number in transmitting at a first time and the matter that transmitting is re-tried by using transmit data which has been set immediately before and has not been erased yet without re-setting transmit data, corresponding to the comparison result of the comparing circuit in re-transmitting after transmitting is finished in failure.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A communication apparatus, comprising:
a transmission control apparatus which has storing means for storing a transmit data word number and transmission information,
wherein said transmit data word number indicates an amount of said transmission information to be transmitted during each transmission cycle, and
said transmission control apparatus transmits and receives according to a communication standard in which the transmit data word number must be less than a set predetermined limit during each transmission cycle; and
a microcomputer connected to said transmission control apparatus wherein said microcomputer provides said transmission control apparatus with said transmission information and sets said transmit data word number in said transmission control apparatus thereby causing said transmission control apparatus to transmit said transmission information;
wherein said transmission control apparatus includes detecting means for detecting whether or not the transmit data word number set by said microcomputer is less than said predetermined limit,
wherein said microcomputer sets the transmit data word number to be less than said predetermined limit in said transmission control apparatus when a first transmission is performed, and
wherein said microcomputer sets the transmit data word number to be greater than said predetermined limit in said transmission control apparatus when re-transmitting is performed after a failure has been detected in said first transmission, and
wherein said transmission control apparatus transmits new transmission information when said transmit data word number set from said microcomputer is less than said predetermined limit, and
wherein said transmission control apparatus immediately re-transmits previously stored transmission information when said detecting means detects that the transmit data word number set from said microcomputer is greater than said predetermined limit.

2. A communication apparatus as set forth in claim 1, wherein said predetermined limit is less than 8.

3. A communication apparatus as set forth in claim 1, wherein said detecting means detects whether or not the transmit data word number, set in said transmission control apparatus by said microcomputer, is greater than said predetermined limit, and said microcomputer sets transmission information to be less than said predetermined limit in said transmission control apparatus when a first transmission is performed, and sets the transmit data word number to be greater than said predetermined limit in said transmission control apparatus when re-transmitting is performed after detecting a failure in said first transmission.

4. A communication apparatus as set forth in claim 3, wherein said predetermined limit is less than 8.

5. A communication apparatus as set forth in claim 1, wherein said detecting means detects whether or not said transmit data word number, set in said transmission control apparatus by said microcomputer, is less than said predetermined limit, and wherein said microcomputer sets said transmit data word number to be less than said predetermined limit in said transmission control apparatus when a first transmission is performed, and sets said transmit data word number to be greater than said predetermined limit in said transmission control apparatus when re-transmitting after detection of a failure in said first transmission.

6. A communication apparatus as set forth in claim 5, wherein said predetermined limit is less than 8.

7. A communication apparatus, comprising;

a transmission control apparatus which has storing means for storing a transmit data word number and transmission information wherein said transmit data word number is for indicating an amount of said transmission information to be transmitted during each transmission cycle, and said transmission device transmits and receives according to a communication standard in which a maximum value of the transmit data word number is prescribed to e less than $2^m$ in each transmission cycle; and a microcomputer connected to said transmission control apparatus wherein said microcomputer provides said transmission control apparatus with said transmission information and sets said transmit data word number in said transmission control apparatus thereby causing said transmission control apparatus to transmit said transmission information;

wherein said transmission control apparatus includes detecting means for detecting whether or not said transmit data word number is $2^m$, wherein said microcomputer sets said transmit data word number to be less than $2^m$ in said transmission control apparatus when a first transmission is performed, and sets $2^m$ as said transmit data word number in said transmission control apparatus when re-transmitting after detection of a failure in said first transmission, and wherein said transmission control apparatus transmits new transmission information when said transmit data word number set from said microcomputer is detected not to be $2^m$ by said detecting means, and wherein said transmission control apparatus immediately re-transmits transmission information already stored in said storing means when said transmit data word number set from said microcomputer is detected to be $2^m$.

8. A communication apparatus as set forth in claim 7, wherein said m equals 3.

9. A communication apparatus, comprising:

a transmission control apparatus which has storing means for storing a transmit data word number and transmission information wherein said transmit data word number is for indicating an amount of said transmission information to be transmitted during each transmission cycle, and said transmission control device transmits and receives according to a communication standard in which a maximum value of said transmit data word number must be less than $2^m$ during each transmission cycle; and a microcomputer connected to said transmission control apparatus wherein said microcomputer provides said transmission control apparatus with said transmission information and sets said transmit data word number in said transmission control apparatus thereby causing said transmission control apparatus to transmit said transmission information;

wherein said transmission control apparatus includes operation means for producing a logical product of the transmit data word number and $2^m$ set from said microcomputer, wherein said transmission control apparatus further includes detecting means for detecting whether or not the logical product of said operation means is "0", wherein said microcomputer sets transmission information including setting the transmit data word number to be less than $2^m$ in said transmission control apparatus when a first transmission is performed, and sets said transmit data word number to be equal to $2^m$ in said transmission control apparatus when re-transmitting after a failure has been detected in said first transmission, and wherein said transmission control apparatus transmits new transmission information when said detecting means detects "0", and wherein said transmission control apparatus immediately re-transmits transmission information already stored in said storing means to a transmission line when said detecting means detects a "1".

10. A communication apparatus as set forth in claim 9, wherein said m equals 3.

11. A communication apparatus capable of transmitting and receiving transmission data over a transmission line, the apparatus comprising:

a microprocessor and a transmission control device connected to the microprocessor and the transmission line;

a storage device in said transmission control device for storing a predetermined limit, a transmit data word number, and transmission data;

wherein said transmission control device transmits said transmission data when an amount of said transmission data is equal to said transmit data word number; and wherein said transmission control device immediately re-transmits said transmission data when said transmission attempt failed and said transmit data word number is set by said microprocessor to be greater than said predetermined amount.

12. A method for transmitting data over a transmission line, said method comprising the steps of:

providing a microprocessor and a transmission control device connected to said microprocessor and said transmission line, said transmission control device having a predetermined word limit;

sending, from said microprocessor, a transmit data word number to said transmission control device, wherein said transmit data word number is less than said predetermined amount;

sending, from said microprocessor, transmission data to said transmission control device;

storing in said transmission control device, said transmission data;

attempting a first transmission of said transmission data from said transmission control device over said transmission line;

receiving, in said microprocessor, a transmission failure signal indicating that said first transmission has failed;

sending, from said microprocessor, a transmit data word number greater than said predetermined amount;

comparing, in said transmission control device, said transmit data word number and said predetermined amount;

immediately re-transmitting said transmission data from said transmission control device over said transmission line if said transmit data word number is greater than said predetermined amount, wherein said transmission data transmitted in said second transmission is identical to said transmission data utilized in said first transmission attempt.

13. A microprocessor data transmission device capable of transmitting and receiving transmission data over a transmission line, the device comprising:

a microprocessor and a transmission control device connected to the microprocessor and the transmission line;

means for storing a predetermined limit in said transmission control device;

means for setting a transmit data word number in said transmission control device controlled by said microprocessor;

means for informing the microprocessor if a previous transmission attempt has failed;

means for comparing said transmit data word number with said predetermined limit;

wherein said transmission control device transmits said transmission data when an amount of said transmission data is equal to said transmit data word number; and wherein said transmission control device re-transmits said transmission data when said means for informing the microprocessor indicates that said transmission attempt failed and said means for comparing indicates that said transmit data word number is greater than said predetermined limit.

* * * * *